(12) United States Patent
Weksler et al.

(10) Patent No.: US 11,126,479 B2
(45) Date of Patent: Sep. 21, 2021

(54) DISTURBANCE SETTING ADJUSTMENT

(71) Applicant: Lenovo (Singapore) Pte. Ltd., Singapore (SG)

(72) Inventors: Arnold S. Weksler, Raleigh, NC (US); John Carl Mese, Cary, NC (US); Mark Patrick Delaney, Raleigh, NC (US); Nathan J. Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/460,290

(22) Filed: Jul. 2, 2019

(65) Prior Publication Data
US 2021/0004279 A1      Jan. 7, 2021

(51) Int. Cl.
*G06F 9/54*      (2006.01)

(52) U.S. Cl.
CPC .................................. *G06F 9/542* (2013.01)

(58) Field of Classification Search
None
See application file for complete search history.

(56) References Cited

U.S. PATENT DOCUMENTS

| 2003/0182431 | A1* | 9/2003 | Sturniolo | H04L 69/161 |
| | | | | 709/227 |
| 2006/0015545 | A1* | 1/2006 | Ezra | G06F 11/1456 |
| 2013/0081064 | A1* | 3/2013 | Huang | G06F 9/542 |
| | | | | 719/318 |
| 2019/0014209 | A1* | 1/2019 | Hamme | H04M 3/436 |
| 2019/0289367 | A1* | 9/2019 | Siddiq | H04N 21/485 |

* cited by examiner

*Primary Examiner* — Chat C Do
*Assistant Examiner* — William C Wood
(74) *Attorney, Agent, or Firm* — Ference & Associates LLC

(57) ABSTRACT

One embodiment provides a method, including: identifying, on an information handling device, an active application; adjusting, using a processor and without additional user input, a disturbance setting based on the active application; and reacting to incoming notifications based on the adjusted disturbance setting. Other aspects are described and claimed.

20 Claims, 3 Drawing Sheets

DISTURBANCE SETTING ADJUSTMENT

BACKGROUND

Users frequently utilize their information handling devices ("devices"), for example, smart phones, tablet devices, laptop and/or personal computers, and the like, to perform a variety of different tasks. For example, users may utilize their devices to create and/or work on documents (e.g., in a word processing application, etc.), communicate with other individuals (e.g., via emails, text messages, social media messages, etc.), interact with media (e.g., music, videos, etc.), and the like. In certain situations, users may not want to be interrupted by notifications (e.g., generated by the system, stemming from other individuals, etc.) while engaged with the task.

BRIEF SUMMARY

In summary, one aspect provides a method, comprising: identifying, on an information handling device, an active application; adjusting, using a processor and without additional user input, a disturbance setting based on the active application; and reacting to incoming notifications based on the adjusted disturbance setting.

Another aspect provides an information handling device, comprising: a processor; a memory device that stores instructions executable by the processor to: identify an active application; adjust, without additional user input, a disturbance setting based on the active application; and react to incoming notifications based on the adjusted disturbance setting.

A further aspect provides a product, comprising: a storage device that stores code, the code being executable by a processor and comprising: code that identifies an active application; code that adjusts a disturbance setting based on the active application; and code that reacts to incoming notifications based on the adjusted disturbance setting.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
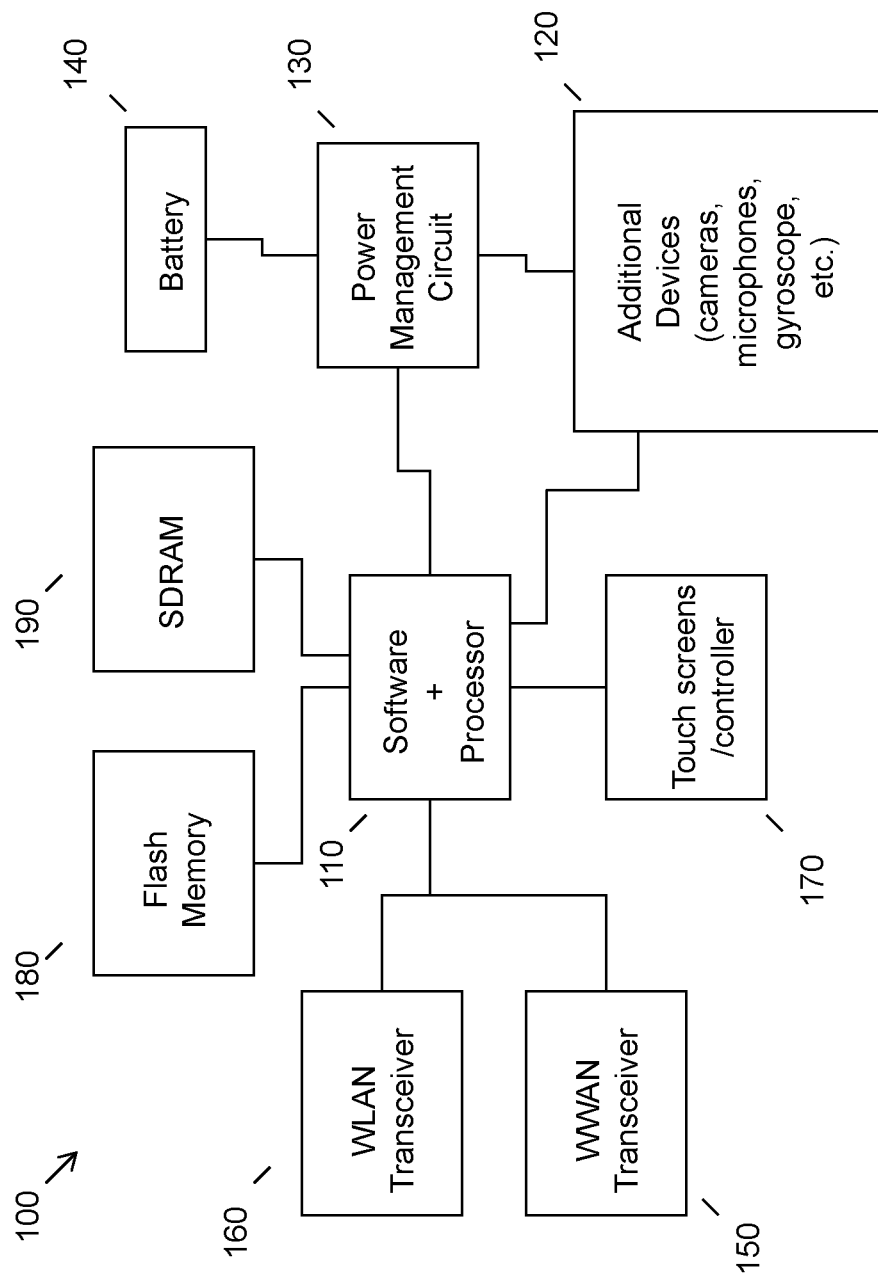
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users may activate a "Do Not Disturb" setting on their device when they do not want to be interrupted while engaged in a particular task or present in a particular location. The activation of this setting may prevent notifications from being transmitted to the user (e.g., by muting the notifications, by not displaying the notifications, etc.). Common situations where a DND setting may be activated include when a user is driving, when a user is located in a particular location (e.g., a movie, a church, etc.), at a particular time of day (e.g., during scheduled meetings, at night time, etc.), and the like.

Conventionally, the DND setting is both activated and deactivated manually by the user. Issues arise, however, when a user forgets to deactivate the DND setting. In these situations, the user may inadvertently extend the DND session longer than they originally intended to, thereby resulting in missed notifications that may be important. Additionally, conventional DND setting activation is conducted on a device-by-device basis. Stated differently, a user must manually activate the DND setting on each of their devices that they do not wish to receive a notification from in a particular instance. This requirement is both burdensome and time-consuming.

Accordingly, an embodiment provides a method for dynamically adjusting a DND setting across one or more devices based upon a user's interactions with an application. In an embodiment, an active application on a user's device may be identified. The active application may be a top level application, an application a user is currently providing input to, etc. An embodiment may then automatically adjust a disturbance setting based on the active application and thereafter react to all incoming communications based on the adjusted disturbance setting. For example, responsive to identifying that a particular application has been opened, an embodiment may dynamically activate a DND setting on one or more devices that blocks all notifications from being transmitted to the user while the application is active. As another example, responsive to identifying that the same application has been closed down, an embodiment may dynamically deactivate a DND setting on the user's device(s). Such a method may provide a more efficient way to manage DND settings across devices and eliminates the need for a user to manually activate and deactivate the DND setting.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
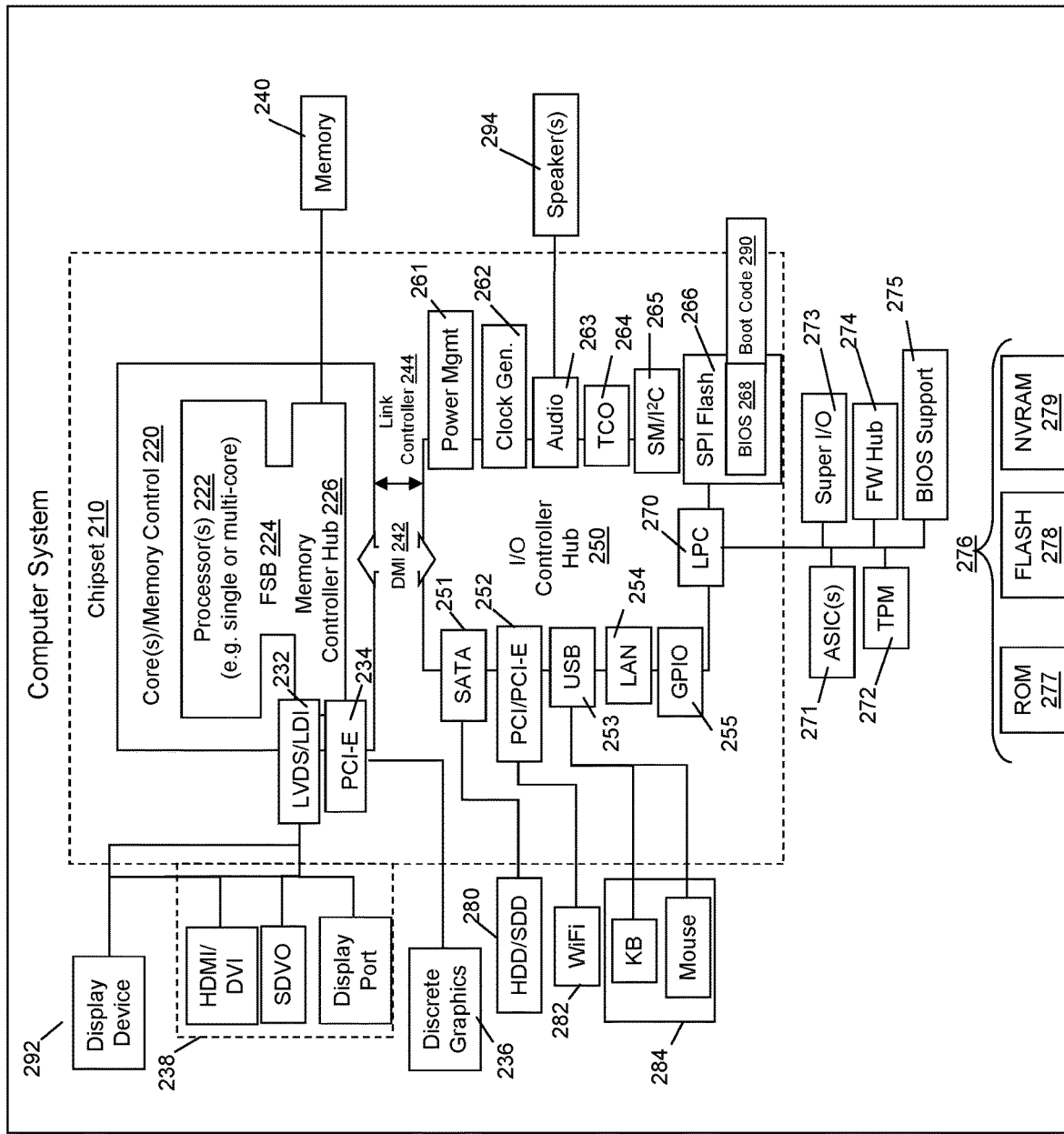
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart TVs, laptops, and/or other electronic devices that may be capable of providing audio or visual notifications to a user. For example, the circuitry outlined in FIG. 1 may be implemented in a tablet or smart phone embodiment, whereas the circuitry outlined in FIG. 2 may be implemented in a laptop.

Figure 3:
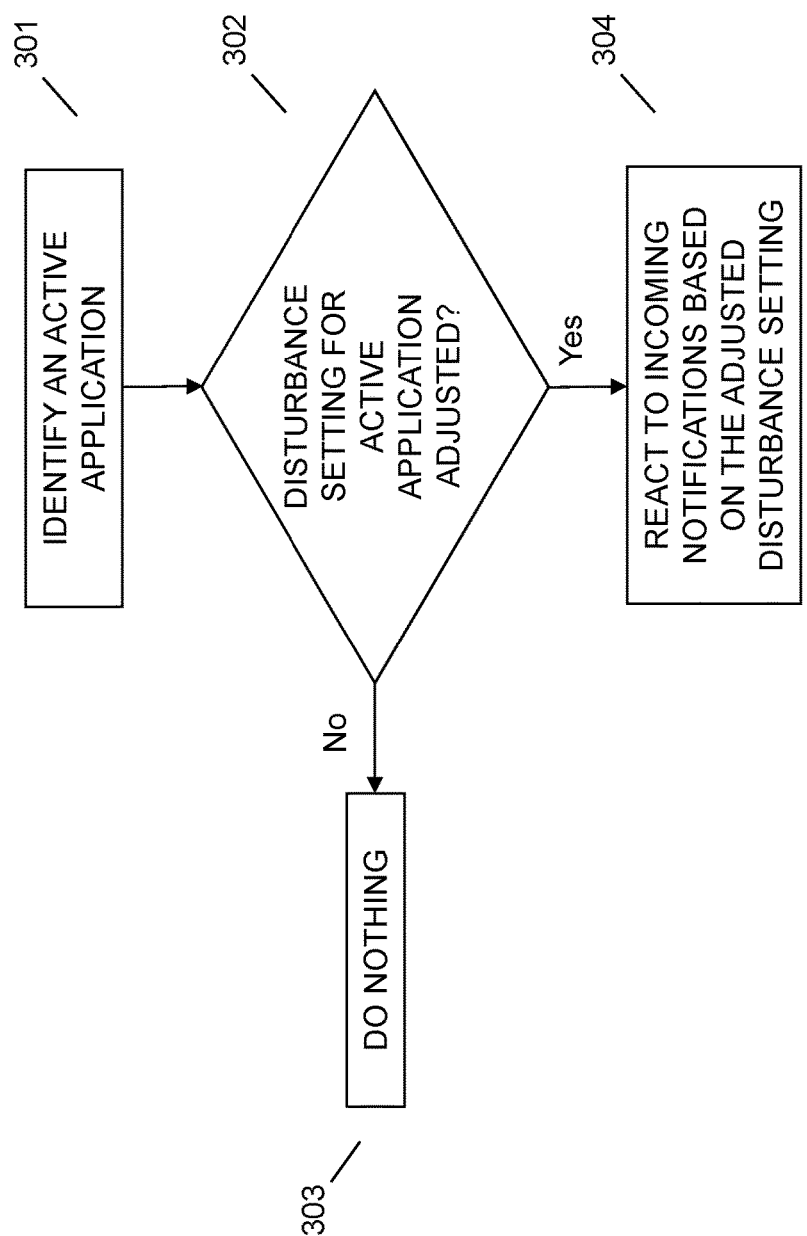
FIG. 3 illustrates an example method of adjusting a disturbance setting on one or more devices.

Referring now to FIG. 3, an embodiment may adjust a disturbance setting on a device based upon an application a user is engaged with. At 301, an embodiment may identify an active application. In an embodiment, the active application may be a top level application (e.g., an application window that is at the forefront of the display, etc.), an application a user is providing input to (e.g., a word processing application, etc.), an application that is outputting media content (e.g., audio content such as music, audiovisual content such as TV shows or movies, etc.), and the like. In an embodiment, the active application may be an application that is running on the user's device or, alternatively, may be an application that is running on another device associated with the user's device.

At 302, an embodiment may adjust a disturbance setting based on the active application. In the context of this application, the disturbance setting may refer to a setting that controls how the user's device, or another device operatively coupled to or in communication with the user's device, reacts to incoming notifications (e.g., generated by the system, generated by another individual, etc.). In an embodiment, the disturbance setting may be adjusted from a default disturbance setting in which all notifications are transmitted to the user. Additionally or alternatively, the disturbance setting may be adjusted from a DND setting back to the default setting. Responsive to not adjusting, at 302, a disturbance setting, an embodiment may, at 304, react to notifications using protocol identified by the default, or current, disturbance setting. Conversely, responsive to adjusting, at 302, a disturbance setting, an embodiment may react, at 304, to incoming notifications based on the adjusted disturbance setting.

In an embodiment, the disturbance setting may be adjusted to an absolute DND setting that may prevent any and all notifications from being transmitted to the user. For example, when a system of an embodiment identifies that a particular application is active on a user's device, the system may prevent any notification received at the user's device, or at another device associated with the user's device, from being transmitted to the user. Alternatively, in another embodiment, the disturbance setting may not be completely rigid and may accommodate certain allowances. For example, although a particular disturbance setting may generally prevent all incoming notifications from being transmitted to a user when a particular application is active, an embodiment may nonetheless allow communications to be received from select individuals (e.g., a user's spouse, a user's boss, etc.). Additionally or alternatively, an embodiment may allow certain types of notifications to be transmitted to the user while censoring others. For example, an embodiment may prevent all audible notifications from being transmitted to the user but may allow some, or all, visual notifications to be displayed to the user. Additionally or alternatively, in yet another embodiment, an embodiment may allow certain devices to provide notifications to a user while censoring notifications originating from other devices. For example, an embodiment may allow the user's device to provide certain types of notifications but may prevent any other associated device from providing notifications. In an embodiment, the allowances may be configured by a manufacturer and/or adjusted by a user.

In an embodiment, the adjustment may be based on one or more characteristics of the active application. For instance, the adjustment may be based solely on whether a particular application is activated or deactivated. For example, an absolute DND setting may be activated responsive to identifying that Application A has been activated and may dynamically be readjusted to a default setting that allows notifications responsive to identifying that Application A has been closed or is no longer the active application. In another embodiment, the adjustment may be based on a user's activity in an active application. For example, an absolute DND setting may be activated responsive to identifying that a user has begun typing in a word processing application and may be readjusted to a default setting after a predetermined period of inactivity has been detected.

In an embodiment, finer levels of user activity within an application may also be identified and considered when adjusting a disturbance setting. For example, an embodiment may maintain a default setting at the outset of a user's interactions with a particular application (i.e., before a user has become completely engrossed in their work) and only enact an adjustment to the disturbance setting once a predetermined period of activity has occurred. Additionally or alternatively, the absoluteness of the disturbance setting may be gradually adjusted. For example, after 10 minutes of working in an application the disturbance setting may be adjusted to only allow notifications from approved sources and after 30 minutes of working in the application the disturbance setting may be further adjusted to an absolute DND setting that prevents any notification from being transmitted to the user. In another instance, an embodiment may be able to identify a user's position within an application, or a user's position within media in the application, and make adjustments to the disturbance settings based on that position. For example, if a user was watching a movie in a movie streaming application an embodiment may dynamically activate an absolute DND setting when it is detected that a user was nearing the conclusion of the movie (e.g., last 20 minutes of the movie, etc.). In another example, an embodiment may be able to identify a cursor/input location in a particular application and may dynamically activate an absolute DND setting when it is detected that the cursor/input location corresponds to a predetermined spot (e.g., an input field of an email application, etc.).

The various embodiments described herein thus represent a technical improvement to conventional disturbance setting adjustment techniques. Using the techniques described herein, an embodiment may first identify an active application. An embodiment may then automatically adjust a disturbance setting based on the active application or a characteristic of the active application. For example, an embodiment may adjust a disturbance setting from a default setting that may allow any communications to be transmitted to a user to an absolute DND setting that prevents any communications from being transmitted to the user. Thereafter, an embodiment may react to incoming notifications based on the adjusted disturbance setting. Such a method may eliminate the need for users to manually activate or deactivate various types of DND settings. Additionally, such a method may ensure that an absolute DND setting does not remain active longer than originally intended.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, on an information handling device, that a video is playing in an active application;
   determining, using a processor, whether a conclusion to the video has begun;
   increasing, responsive to determining that the conclusion to the video has begun, a disturbance setting; and
   automatically reacting to an incoming notification based on the increased disturbance setting, wherein the automatically reacting comprises transmitting a predetermined response to a sender of the incoming notification without interrupting the conclusion to the video.

2. The method of claim 1, wherein the active application is running on the information handling device.

3. The method of claim 1, wherein the adjusting the disturbance setting comprises adjusting the disturbance setting for the information handling device.

4. The method of claim 1, wherein the adjusting the disturbance setting comprises providing, to at least one other device, an instruction to adjust the disturbance setting on the at least one other device.

5. The method of claim 1, wherein the adjusting comprises adjusting the disturbance setting responsive to identifying that a predetermined event has occurred in the active application.

6. The method of claim 5, wherein the predetermined event is an inactivity event.

7. The method of claim 5, wherein the predetermined event is an application closing event.

8. The method of claim 1, wherein the reacting comprises ignoring all of the incoming notifications.

9. The method of claim 1, wherein the reacting comprises providing a notification that an approved incoming notification from the incoming notifications has been received.

10. The method of claim 9, wherein the approved incoming communication corresponds to at least one of: an incoming communication from an approved source, an incoming communication of an approved type, and an incoming communication from an approved application.

11. An information handling device, comprising:
    a processor;
    a memory device that stores instructions executable by the processor to:
    identify that a video is playing in an active application;
    determine whether a conclusion to the video has begun;
    increase, responsive to determining that the conclusion to the video has begun, a disturbance setting; and
    automatically react to an incoming notification based on the increased disturbance setting, wherein the automatically reacting comprises transmitting a predetermined response to a sender of the incoming notification without interrupting the conclusion to the video.

12. The information handling device of claim 11, wherein the active application is running on the information handling device.

13. The information handling device of claim 11, wherein the instructions executable by the processor to adjust the disturbance setting comprise instructions executable by the processor to adjust the disturbance setting for the information handling device.

14. The information handling device of claim 11, wherein the instructions executable by the processor to adjust the disturbance setting comprise instructions executable by the processor to provide, to at least one other device, an instruction to adjust the disturbance setting on the at least one other device.

15. The information handling device of claim 11, wherein the instructions executable by the processor to adjust comprise instructions executable by the processor to adjust the disturbance setting responsive to identifying that a predetermined event has occurred in the active application.

16. The information handling device of claim 15, wherein the predetermined event is an inactivity event.

17. The information handling device of claim 15, wherein the predetermined event is an application closing event.

18. The information handling device of claim 11, wherein the instructions executable by the processor to react comprise instructions executable by the processor to ignore all of the incoming notifications.

19. The information handling device of claim 11, wherein the instructions executable by the processor to react comprise instructions executable by the processor to provide a notification that an approved incoming notification from the incoming notifications has been received.

20. A product, comprising:
a storage device that stores code, the code being executable by a processor and comprising:
the code that identifies that a video is playing in an active application; code that determines whether a conclusion to the video has begun;
the code that increases, responsive to determining that the conclusion to the video has begun, a disturbance setting; and
code that automatically reacts to an incoming notification based on the increased disturbance setting, wherein the automatically reacting comprises transmitting a predetermined response to a sender of the incoming notification without interrupting the conclusion to the video.

\* \* \* \* \*